(12) United States Patent
Wilson

(10) Patent No.: US 10,519,999 B2
(45) Date of Patent: Dec. 31, 2019

(54) CABLE TOGGLE

(71) Applicant: ERICO INTERNATIONAL CORPORATION, Solon, OH (US)

(72) Inventor: Eric J. Wilson, Solon, OH (US)

(73) Assignee: ERICO INTERNATIONAL CORPORATION, Solon, OH (US)

( * ) Notice: Subject to any disclaimer, the term of this patent is extended or adjusted under 35 U.S.C. 154(b) by 0 days.

(21) Appl. No.: 15/981,621

(22) Filed: May 16, 2018

(65) Prior Publication Data

US 2018/0335064 A1 Nov. 22, 2018

Related U.S. Application Data

(60) Provisional application No. 62/508,095, filed on May 18, 2017.

(51) Int. Cl.
| | |
|---|---|
| *F16B 13/08* | (2006.01) |
| *F16G 11/00* | (2006.01) |
| *H02G 3/00* | (2006.01) |
| *F16M 13/02* | (2006.01) |

(52) U.S. Cl.
CPC .......... *F16B 13/0808* (2013.01); *F16G 11/00* (2013.01); *F16M 13/02* (2013.01); *H02G 3/263* (2013.01)

(58) Field of Classification Search
CPC .... F16M 13/0808; F16M 13/02; F16G 11/00; H02G 3/263; F16B 13/08; F16B 13/04; F16B 13/0808; E04F 11/18
USPC ................ 411/340, 346, 345, 401; 52/285.4; 294/67.3, 67.31
See application file for complete search history.

(56) References Cited

U.S. PATENT DOCUMENTS

| | | | | |
|---|---|---|---|---|
| 1,068,479 | A * | 7/1913 | Brainard | F16B 13/0808 411/346 |
| 1,165,759 | A * | 12/1915 | Coughlin | C14B 1/26 24/72.7 |
| 2,504,325 | A * | 4/1950 | Graver | F16B 13/0808 411/345 |
| 2,919,089 | A * | 12/1959 | Durham | F16B 13/002 248/71 |

(Continued)

FOREIGN PATENT DOCUMENTS

| | | |
|---|---|---|
| AU | 199058808 A | 1/1991 |
| AU | 2010101014 A4 | 10/2010 |

(Continued)

OTHER PUBLICATIONS

Stainless Cable & Railing; retrieved from the internet Aug. 10, 2018; <http://stainlesscablerailing.com/toggle-anchor.html>; 3 pages.

(Continued)

*Primary Examiner* — Christopher Garft
(74) *Attorney, Agent, or Firm* — Quarles & Brady LLP

(57) ABSTRACT

A toggle can secure a cable relative to a structure with a fixing aperture. A body of the toggle can include a cable portion and a set of side walls. The cable portion can receive and secure the cable. The side walls can extend away from the cable portion to define a channel, with the channel being at least partly open along one or more sides of the toggle body. The toggle body can be configured to engage the structure along a loading side of the body to secure the cable relative to the structure.

20 Claims, 9 Drawing Sheets

(56) References Cited

U.S. PATENT DOCUMENTS

| | | | | |
|---|---|---|---|---|
| 3,211,042 A * | 10/1965 | Fischer | ............... | F16B 13/0808 |
| | | | | 411/344 |
| 3,636,594 A | 1/1972 | Faivre | | |
| 4,439,079 A | 3/1984 | Losanda | | |
| 4,449,873 A * | 5/1984 | Barth | ............... | F16B 13/0808 |
| | | | | 411/341 |
| 4,573,844 A | 3/1986 | Smith | | |
| 5,215,418 A | 6/1993 | Trainer et al. | | |
| 5,226,767 A | 7/1993 | Foerster, Jr. | | |
| 6,131,640 A * | 10/2000 | Judkins | ............... | E06B 9/326 |
| | | | | 160/168.1 R |
| 8,128,329 B2 | 3/2012 | Pilon | | |
| 8,353,653 B2 | 1/2013 | Guthrie et al. | | |
| 8,567,151 B2 * | 10/2013 | Walther | ............... | E04B 1/003 |
| | | | | 52/223.13 |
| 8,858,143 B2 | 10/2014 | Gaudron et al. | | |
| 9,072,509 B2 | 7/2015 | Stoll, Jr. et al. | | |
| 9,394,932 B2 | 7/2016 | McDuff et al. | | |
| 2004/0170486 A1 * | 9/2004 | DeMeo | ............... | F16B 13/0808 |
| | | | | 411/340 |
| 2009/0249738 A1 * | 10/2009 | Brereton | ............ | E04F 11/1817 |
| | | | | 52/741.2 |
| 2010/0295008 A1 * | 11/2010 | Arena | ................ | E04F 11/1817 |
| | | | | 256/47 |
| 2011/0225793 A1 | 9/2011 | Daniels, III | | |
| 2011/0268528 A1 | 11/2011 | Gaudron et al. | | |
| 2017/0314600 A1 | 11/2017 | Daly | | |

FOREIGN PATENT DOCUMENTS

| | | |
|---|---|---|
| GB | 2299142 A | 9/1996 |
| GB | 2378980 A | 2/2003 |

OTHER PUBLICATIONS

Gripple Toggle; retrieved from the internet Aug. 10, 2018; <https://www.gripple.com/us/us/p59/a109/b169/toggle>; 2 pages.

Rize Enterprises, LLC; Copyright Rize Enterprises, LLC; retrieved from the internet Aug. 10, 2018 <http://www.rizellc.com/cable-toggle.html>; 1 page.

NVent Caddy; Copyright 2018 nVent; retrieved from the Internet Aug. 10, 2018; <https://www.erico.com/category.asp?category=R254>; 2 pages.

* cited by examiner

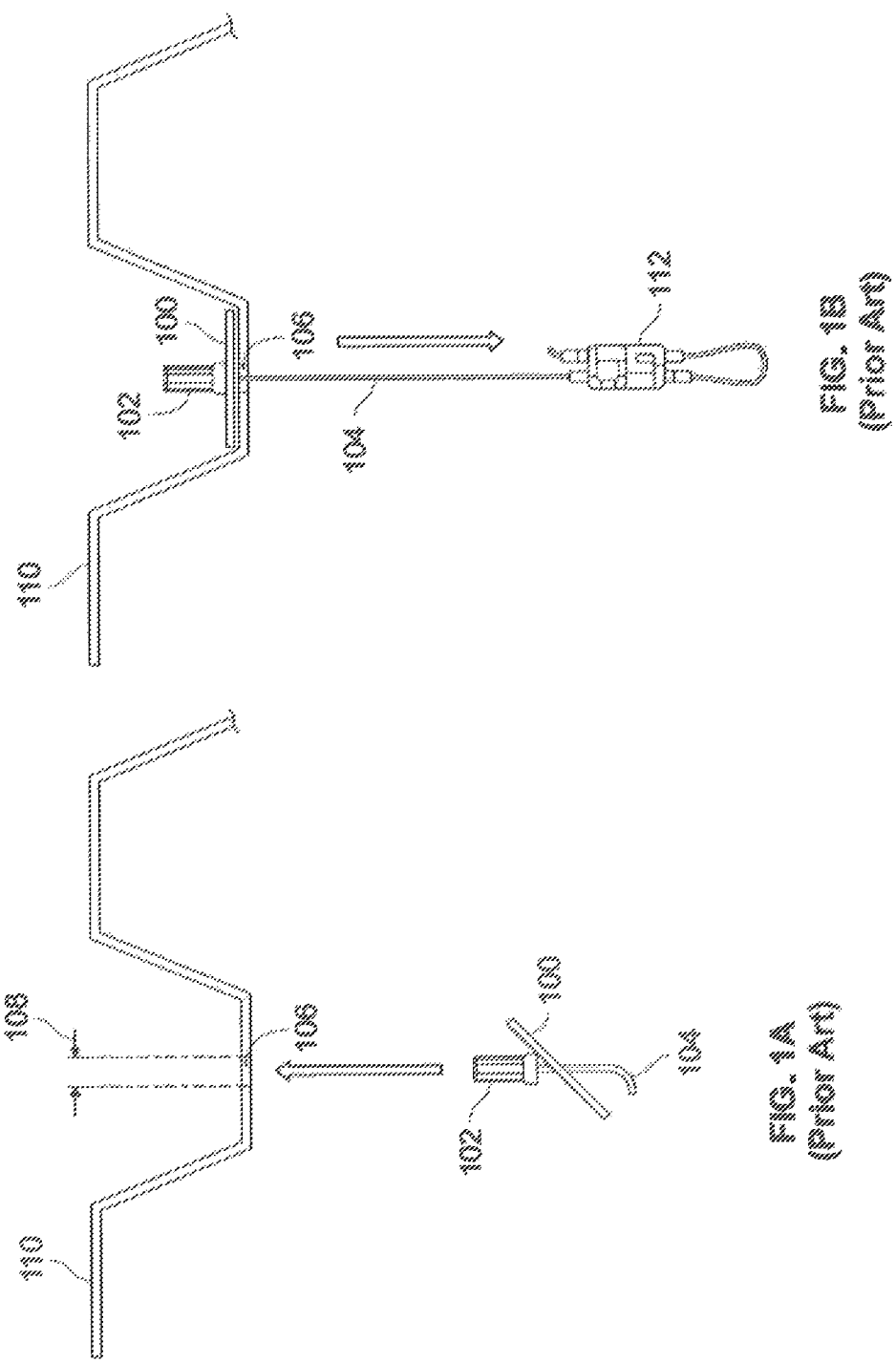

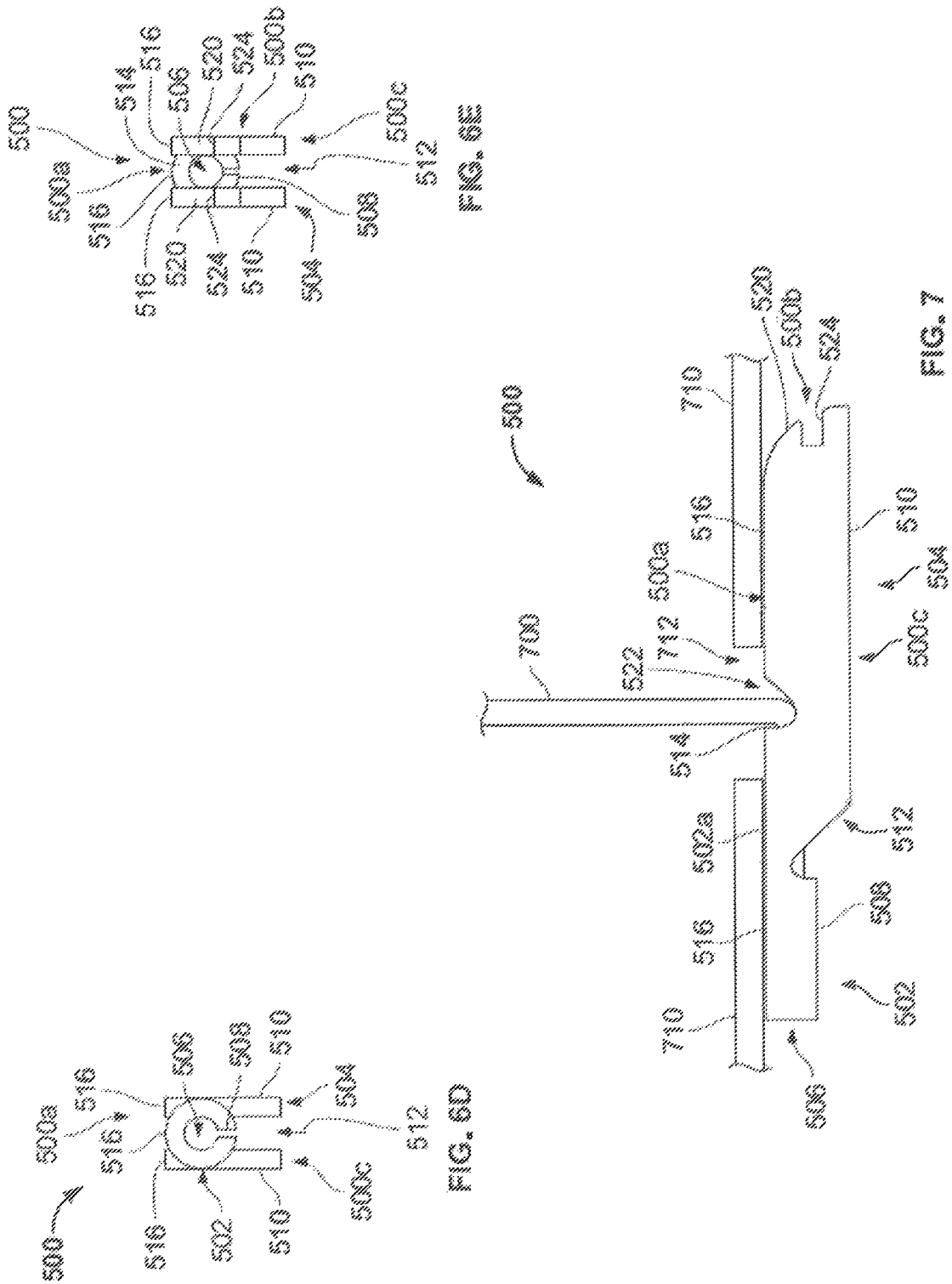

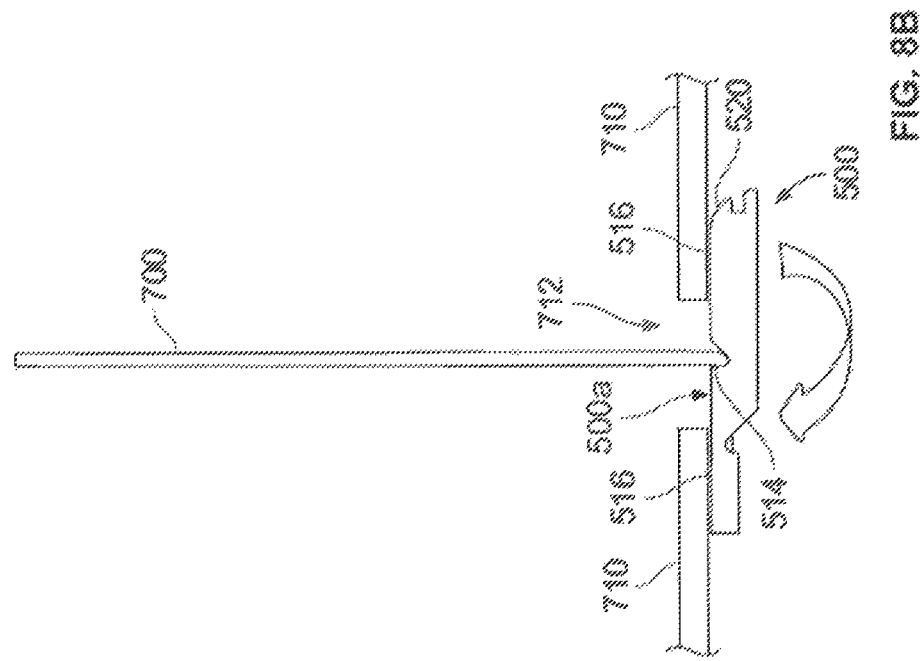
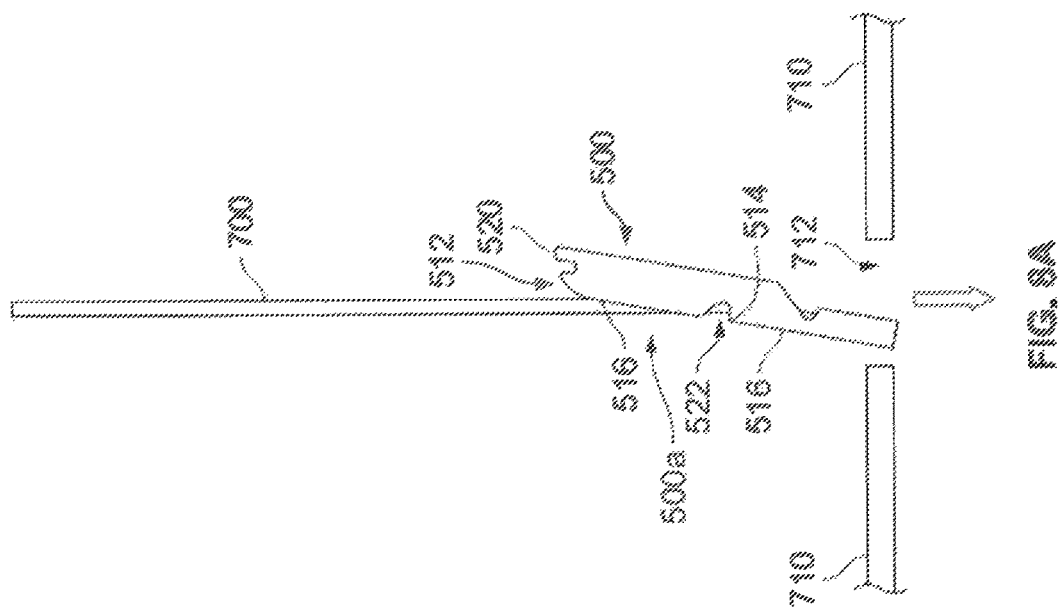

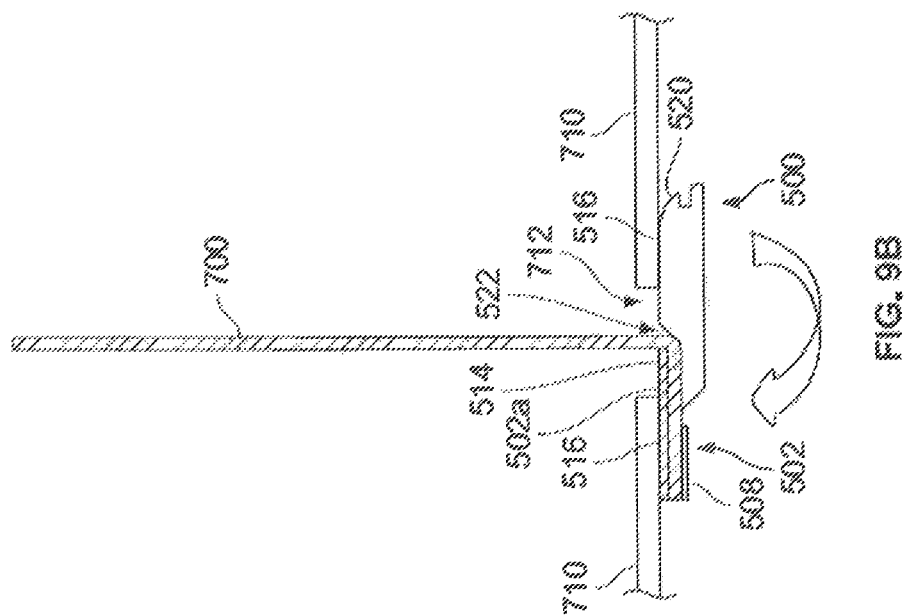
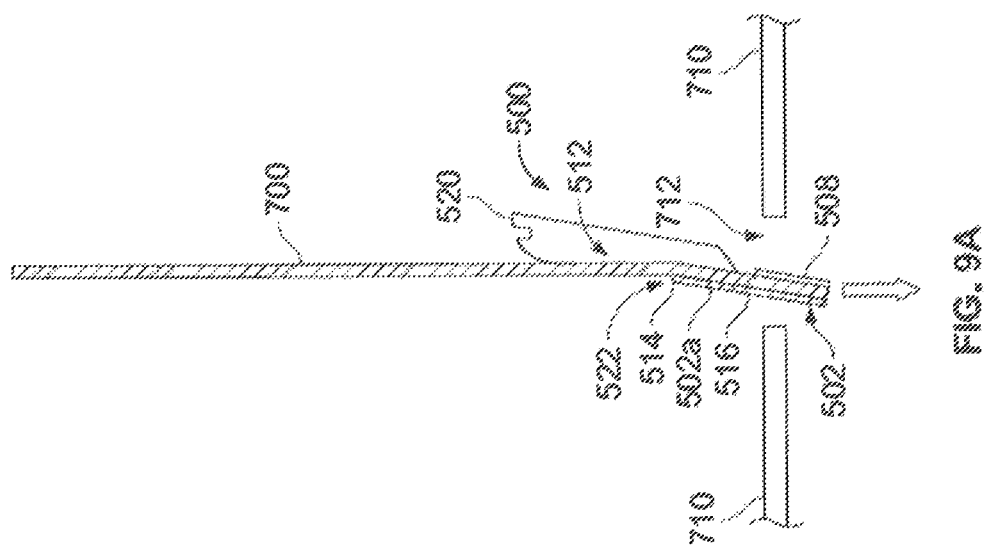

CABLE TOGGLE

RELATED APPLICATIONS

This application claims priority to U.S. Provisional Patent Application No. 62/508,095, titled "Cable Toggle" and filed May 18, 2017, the entirety of which is incorporated herein by reference.

BACKGROUND

A toggle can generally be used when hanging a load from or otherwise securing a load to a structure. For example, toggles can be used to suspend lighting, shelving, duct work, or other equipment from support beams or other structures. Generally, a toggle connects to a cable, which is inserted into a fixing aperture in the relevant structure. Once the toggle is inserted into the fixing aperture, the structure of the toggle spans the fixing aperture to prevent the cable from pulling out of the fixing aperture when a load is applied.

Conventional toggles can be configured with two-piece configurations. For example, a first piece can be a stop sleeve, which can be fixedly attached (e.g., crimped transversely) to a cable. Generally, the stop sleeve can provide a hub of relatively large diameter to distribute loads on the cable, while exhibiting a small enough diameter to be threaded through a fixing aperture on a structure. A second piece of a conventional toggle can be a flat toggle plate that can be loosely disposed on the cable (e.g., with the cable threaded loosely therethrough) so that the cable, but not the stop sleeve can pass therethrough. Generally, the flat toggle plate can be configured to be inserted through the fixing aperture with the stop sleeve, then manipulated to span the fixing aperture and thereby maintain the stop sleeve on one side of the structure. In this way, for example, when the cable is loaded in tension from an opposite side of the structure, the flat-toggle plate can receive and distribute the load via engagement with the stop sleeve.

SUMMARY

Embodiments of the invention can provide an improved toggles to support cables, such as single-strand wires, woven or other cables, cable or wire bundles, and so on, relative to structures. Some embodiments of the invention can provide single-piece cable toggles configured for ease of manufacture and installation.

Some embodiments of the invention provide a toggle to secure a cable relative to a structure with a fixing aperture. A single-piece body of the toggle can include a cable portion that defines a loading side and is configured to receive and secure the cable, and side walls that extend from the cable portion to define a channel. The channel can extend between a loading side of the side walls and a non-loading side of the side walls and can be at least partly open along the loading side of the side walls and at least partly open along the non-loading side of the side walls. The loading side of the side walls can extend in parallel with the loading side of the cable portion to define substantially parallel loading surfaces along the side walls and the cable portion. The single-piece body can be configured to engage the structure along the substantially parallel loading surfaces to secure the cable relative to the structure.

Some embodiments of the invention provide a toggle to secure a cable relative to a structure with a fixing aperture, for use with a tool. An integrally-formed body of the toggle can have a loading side that is configured to engage the structure to secure the cable to the structure, and a non-loading side that is substantially opposite the loading side. The integrally-formed body can define an elongate direction and can include a cable portion and side walls. The cable portion can be configured to be receive and secure the cable. The side walls can extend substantially in parallel away from the cable portion to define a channel.

The toggle can be configured to move between an installation configuration and an installed configuration. In the installation configuration, the cable can extend from the cable portion along the channel, to configure the cable and the toggle to pass together through the fixing aperture. In the installed configuration, the side walls and the cable portion can engage the structure along the loading side of the channel to prevent the toggle from passing through the fixing aperture, and the cable can extend out of the loading side of the channel to be disposed substantially perpendicularly to the elongate direction and pass through the fixing aperture. At least one of the side walls can include at least one engagement feature that is configured to receive the tool, in order to maintain the toggle in the installation configuration for passage of the toggle and the cable through the fixing aperture.

Some embodiments of the invention provide a toggle to secure a cable relative to a structure with a fixing aperture. The toggle can include a single-piece body with a cable portion, a guide portion, a loading side configured to engage the structure to secure the cable to the structure, and a non-loading side that is substantially opposite the loading side. The cable portion can be configured to be crimped around the cable with a crimp seam extending along the non-loading side of the single-piece body. The guide portion can extend away from the cable portion to define a channel. Along the loading side of the single-piece body, a loading side of the guide portion can extend substantially in parallel with a loading side of the cable portion to define substantially parallel loading surfaces along the guide portion and the cable portion. The single-piece body can be configured to engage the structure along the substantially parallel loading surfaces, to secure the cable relative to the structure with the cable extending substantially perpendicularly out of the channel to extend through the fixing aperture.

DESCRIPTION OF THE DRAWINGS

FIG. 1A is a front elevation partial view of a conventional toggle system before installation;

FIG. 1B is a front elevation view of the conventional toggle system of FIG. 1A after installation;

FIG. 6D is a left side elevation view of the cable toggle of FIG. 5A;

FIG. 6E is a right side elevation view of the cable toggle if FIG. 5A;

FIG. 7 is a front elevation view of the cable toggle of FIG. 5A in an installed configuration;

FIG. 8A is a front elevation view of the cable toggle of FIG. 5A in an installation configuration, illustrating part of a method of installation of the toggle according to an embodiment of the invention;

FIG. 8B is a front elevation view of the cable toggle of FIG. 5A in the installed configuration, illustrating another part of the method of installation of FIG. 8A;

FIG. 9A is a cross-sectional front elevation view of the cable toggle of FIG. 5A during installation;

FIG. 9B is a cross-sectional front elevation view of the cable toggle of FIG. 5A after installation.

DETAILED DESCRIPTION

Figure 3:
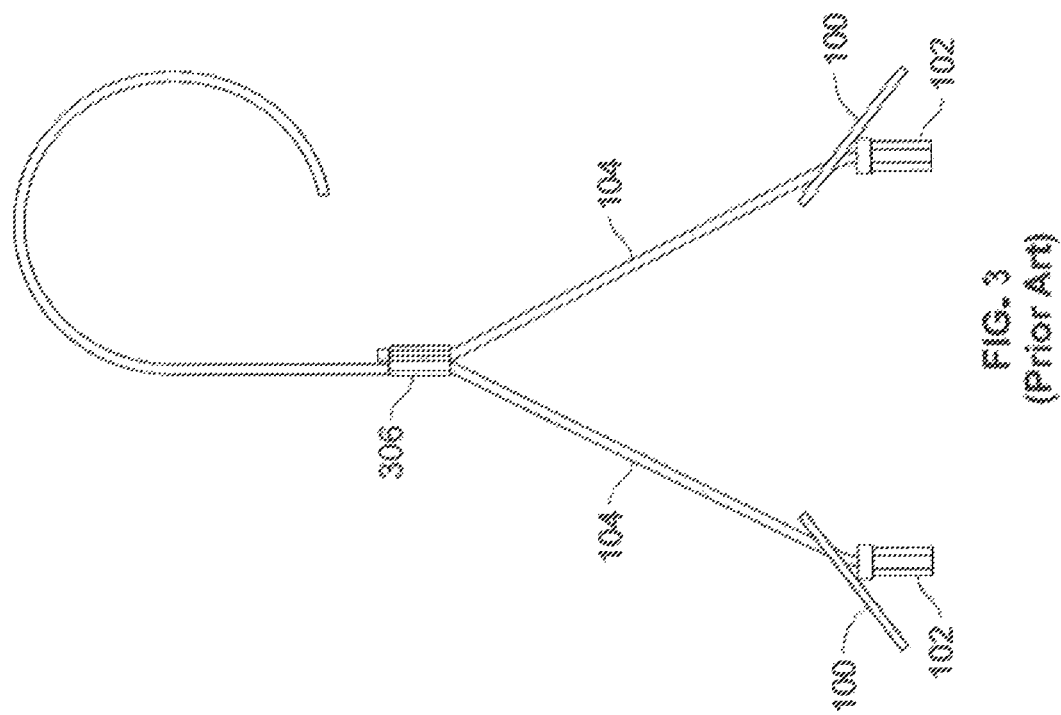
FIG. 3 is a front elevation view of another conventional toggle system before installation.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As used herein, unless otherwise specified or limited, "single-piece" can be defined as manufactured in one undivided piece. A single-piece object can be manufactured in different ways, including via stamping, casting, additive manufacturing, or otherwise.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

As also described above, conventional toggles can be formed to include at least two separate pieces, in addition to a cable. Generally, in a two-piece configuration, including as described above, both elements (e.g., a stop sleeve and a flat toggle plate) are dimensioned to pass through the relevant fixing aperture during installation. Once inserted, at least one of the pieces (e.g., the flat plate) must be rotated from an orientation that is generally aligned (e.g., close to parallel) with the cable to an orientation that is generally perpendicular to the cable. Managing this installation process, including management of the two distinct pieces, can sometimes be difficult.

Examples of conventional two-piece configurations that use a flat toggle plate and a stop sleeve are illustrated in FIGS. 1A through 4. For example, FIGS. 1A and 1B illustrate a conventional toggle with a flat toggle plate 100 and a stop sleeve 102, during and after installation on a structure 110.

Figure 2:
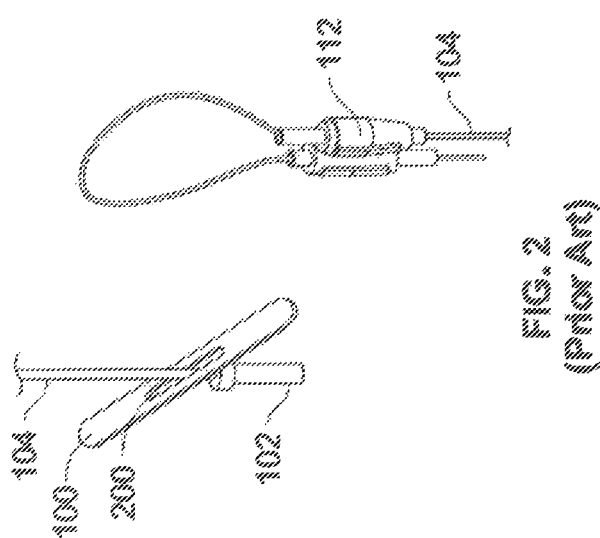
FIG. 2 is an isometric partial view of the conventional toggle system of FIG. 1A before installation.

Generally, the toggle plate 100 is configured to be moved relative to the cable 104 during installation. As illustrated in FIG. 2, for example, the toggle plate 100 includes a channel 200 through which the cable 104 extends. The channel 200 is sized to enable lateral, longitudinal, and angular repositioning of the toggle plate 100 relative to the cable 104, including during installation. However, a width of the channel 200 is generally narrower than a characteristic diameter of the stop sleeve 102. Accordingly, the stop sleeve 102 cannot pass through the channel 200, and thereby retains the toggle plate 100 on the cable 104.

As illustrated in FIG. 1A, the toggle plate 100 and the stop sleeve 102 can be disposed to be inserted through a fixing aperture 106 with a fixing aperture diameter 108. Both the toggle plate 100 and the stop sleeve 102 are generally dimensioned to fit through the fixing aperture 106, with the toggle plate 100 appropriately angled relative to the cable 104. However, although the toggle plate 100 exhibits a width and a depth that are smaller than the diameter 108, the length of the toggle plate 100 is substantially larger than the diameter 108. Accordingly, although the toggle plate 100 can pass through the fixing aperture 106 in an elongate direction (e.g., when extending substantially in parallel with the cable 104 at the fixing aperture 106), the toggle plate 100 cannot pass through the fixing aperture 106 when the toggle plate 100 is oriented generally parallel to the structure 110 (see, e.g., FIG. 1B).

Due to the adjustability of the toggle plate 100 relative to the cable 104, the toggle plate 100 can be secured on one (e.g., the top) side of the structure 110 by being oriented for insertion through the fixing aperture 106 (see, e.g., FIG. 1A) and then re-oriented to be generally perpendicular to the cable 104 (see, e.g., FIG. 1B). Thus arranged, as also noted above, the toggle plate 100 cannot readily pass back through the fixing aperture 106. Further, because the stop sleeve 102 cannot pass through the channel 200, the stop sleeve 102 can bear on the toggle plate 100 and, thereby, the structure 110, to secure the cable 104 to the structure 110. This may be useful, as illustrated in FIG. 1B, in order to suspend a locking device 112 or other object (not shown) from the structure 110.

In the arrangement illustrated in FIG. 1B, the stop sleeve 102 directly contacts the toggle plate 100 after installation. Further, the toggle plate 100 remains generally perpendicular to the cable 104 and locally parallel to the structure 110, with the force of tension loads on the cable being conveyed to the toggle plate 100 by the stop sleeve 102, and then distributed across the toggle plate 100 and onto the structure 110.

Figure 4:
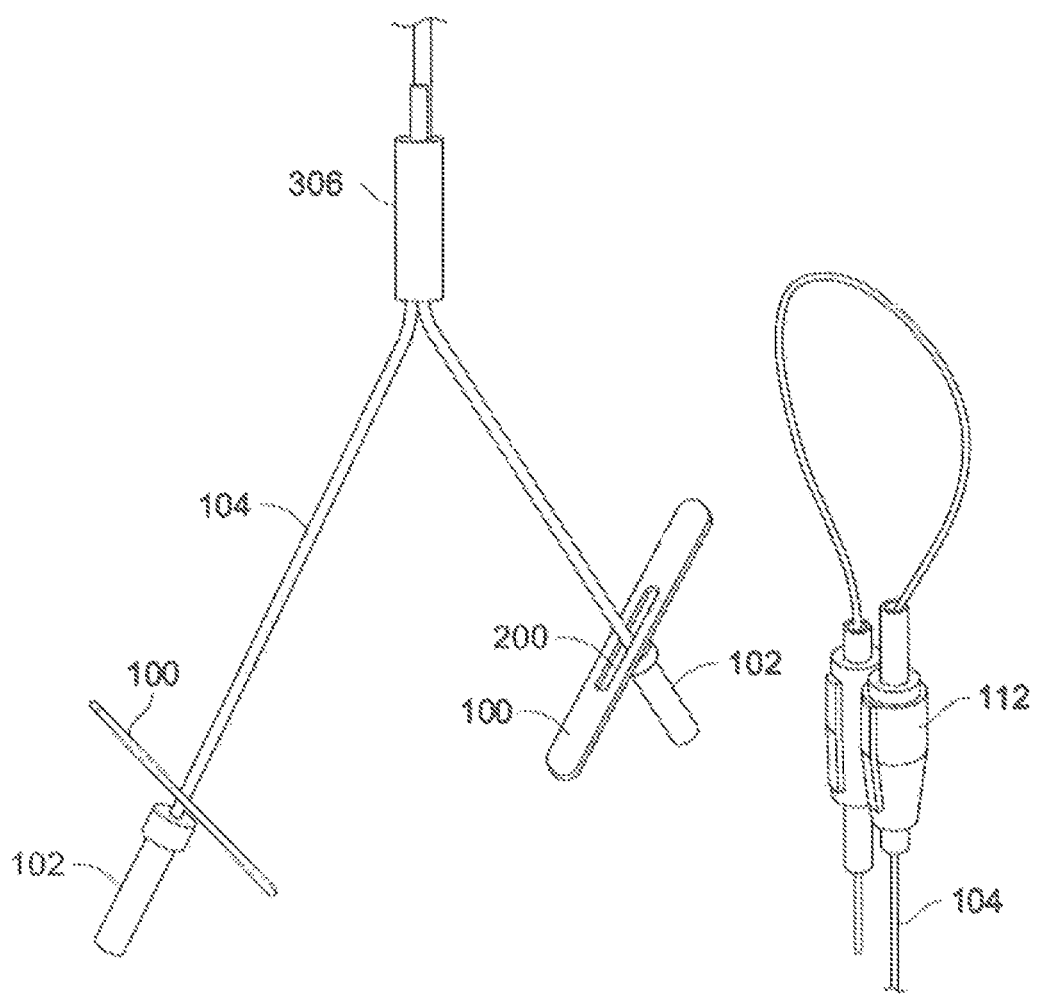
FIG. 4 is an isometric partial view of the conventional toggle system of FIG. 3 before installation.

FIGS. 3 and 4 illustrate another conventional two-piece toggle system, which utilizes two instances of the toggle plate 100, the cable 104, and the stop sleeve 102 of FIGS. 1A and 1B. In the illustrated configuration, a compression sleeve 306 secures the two cables 104 together into a Y-toggle system, with each cable 104 of the "Y" including a respective toggle that includes one of the toggle plates 100 and one of the stop sleeves 102. Similarly to the example illustrated in FIGS. 1A through 2, the stop sleeves 102 can be crimped onto the ends of the cables 104. Likewise, the toggle plates 100 can be movably engaged with the cables 104 due to the inclusion of the channels 200 on the toggle plates 100 (see FIG. 4). Thus arranged, the Y-toggle system can be installed similarly to the system of FIGS. 1A through 2, but through two separate fixing apertures, to support a locking device 112 (see FIG. 4) or other object relative to a structure.

In the examples illustrated, the toggle arrangements of FIGS. 1A through 4 are configured for "flat-toggle" loading. In particular, the toggles are secured relative to structures by the toggle plates 100 lying flat on the structures, rather than, for example, on edge. This configuration can somewhat limit the load capacity of the toggles, due to the relatively low strength of a planar body seated flatly across an opening.

Further, while the conventional toggles discussed above can be usefully employed to attach loads to structures, they may be relatively difficult to install. For example, operators may be required to locate the toggle plate along an extended length of cable, manually slide the toggle plate along the cable to the stop sleeve, manually align both the stop sleeve and toggle plate for insertion through the fixing aperture, maintain the alignment of both parts through the insertion, then manually ensure that the toggle plate appropriately re-aligns to engage the structure and support the relevant load.

Embodiments of the invention can address these or other issues. For example, some embodiments of the invention provide a single-piece toggle, which can be relatively easily manufactured and installed. Further, in some embodiments of the invention, a toggle can include a set of edge-loading side walls that provide an "edge-toggle" configuration, in contrast to the flat-toggle configuration of the toggle plates 100 of FIGS. 1A through 3.

In some embodiments, other beneficial features can be provided. For example, some toggles according to the invention can include curved or otherwise contoured ends to engage a support structure and thereby automatically rotate the toggle into an installed configuration relative to the structure. As another example, some toggles according to the invention can include engagement features to assist in installing or uninstalling the toggles relative to a structure.

In some embodiments, a toggle according to the invention can include a loading side and a crimp section to secure a cable, with the crimp section aligned longitudinally along the cable (e.g., as opposed to a conventional orientation that is perpendicular relative to the cable). Further, in some embodiments, a crimp seam of the crimp section can be disposed on a non-loading side of the toggle. This can be useful, for example, in order to allow for relatively easy manufacturing and assembly, while also reducing the likelihood that loading of a flexible (or other) cable will cause the cable to pull free of the toggle at the crimp seam. In some embodiments, integrally forming a crimp section with a load-bearing portion of a toggle (e.g., a toggle plate) can take advantage of the ability of a flexible cable to conform and cooperate with the geometry of single-piece toggle, rather than relying on the use of multiple components, including a specific cable-engagement piece (e.g., the stop sleeve 102, as discussed above), to engage a cable and distribute the axial loading thereof.

In some embodiments of the invention, including those with an integral crimp section, a toggle can exhibit an asymmetric toggle design. For example, one portion of the toggle can include a crimp section or other cable-engagement portion, while another portion of the toggle can include one or more other load-bearing features. In some embodiments, a transition section can connect each side of a crimp section to a respective wall of a doubled edge-plate toggle that defines a cable channel. In some embodiments, a crimp section or a transition section can also include load-bearing features, such as a load-bearing surface that extends in parallel and in-plane with load-bearing surfaces on other parts of the toggle.

FIGS. 5A through 9B illustrate an example configuration of a toggle 500, according to one embodiment of the invention. The toggle 500 is integrally formed as a single-piece body with a cable portion configured as a crimp section 502. Generally, the crimp section 502 can be used to secure a cable (not shown in FIGS. 5A through 6E) to the toggle 500. The crimp section 502 is integrally connected to a cable guide section 504, which can contain and guide movement of the cable relative to the toggle 500. As also described below, in some configurations the toggle 500 and the cable guide section 504 can simultaneously and cooperatively engage a structure (see, e.g., FIG. 7) to support the cable relative to the structure.

To receive a cable, the crimp section 502 (and the body of the toggle 500 generally) can be formed to include a through-hole 506. In the embodiment illustrated, the crimp section 502 has been formed to define a round circular profile with a constant diameter for the through-hole 506. In some embodiments, a cable portion of a toggle can exhibit other profiles (e.g., a hexagonal cross-section) when closed around or otherwise engaged with a cable.

Figure 5A:
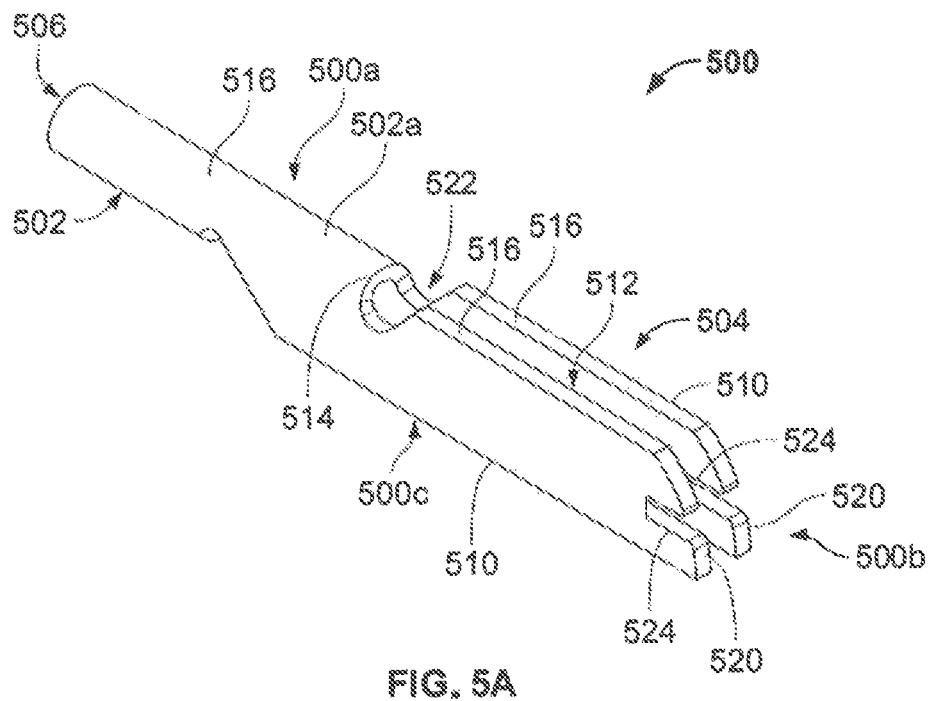
FIG. 5A is a bottom, isometric view of a cable toggle, in accordance with one embodiment of the present invention.
Figure 5B:
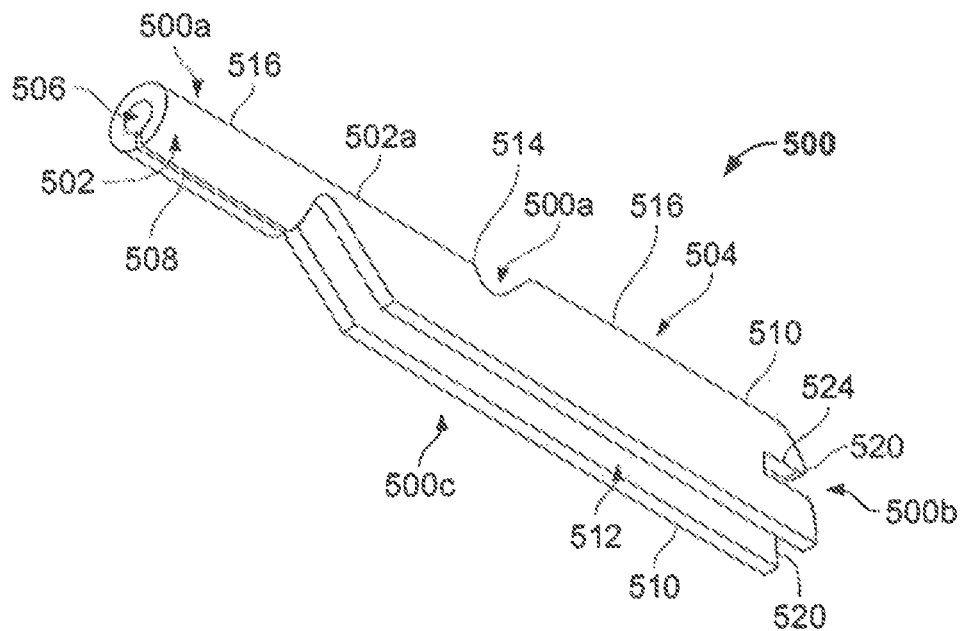
FIG. 5B is a top, isometric view of the cable toggle of FIG. 5A.

When crimped around a cable to secure the cable to the toggle 500, the crimp section 502 defines a crimp seam 508 (see, e.g., FIG. 5B). In the embodiment illustrated, the crimp seam 508 extends along an elongate direction of the body (e.g., left to right in FIGS. 6A through 6C) and along an axial direction of a cable engaged by the crimp section 502 (see, e.g., FIG. 9A). Also in the embodiment illustrated, and as also discussed below, the crimp seam 508 is formed to be disposed opposite a loading side of the toggle 500.

In the embodiment illustrated, the crimp section 502, which is generally configured to secure a cable to the toggle 500, transition continuously to the cable guide section 504, which is generally configured to guide movement of the cable relative to the toggle 500. For example, in the embodiment illustrated, the crimp section 502 is generally circular, and transitions continuously near the center of the toggle (relative to the elongate direction) to a set of side walls of the cable guide section 504 that are configured as substantially parallel flat side-wall plates 510. As also discussed below, the plates 510 are oriented to serve as edge-toggle support walls for the toggle 500, thereby allowing for a relatively large load capacity for a given material type and thickness.

In order to accommodate movement of an attached cable within the toggle 500, the plates 510 define a cable channel 512 with a generally rectangular cross section. As also discussed below, during installation of the toggle 500, the separation between the two plates 510 can provide a passage via the channel 512 for a cable to pivot into generally alignment along the elongate direction of the toggle 500 within the crimp section 502. Further, the passage provided by the channel 512 can also allow the cable to freely pivot to extend out of the channel 512 (e.g., perpendicularly) when the toggle 500 is installed and the cable loaded.

Figure 6A:
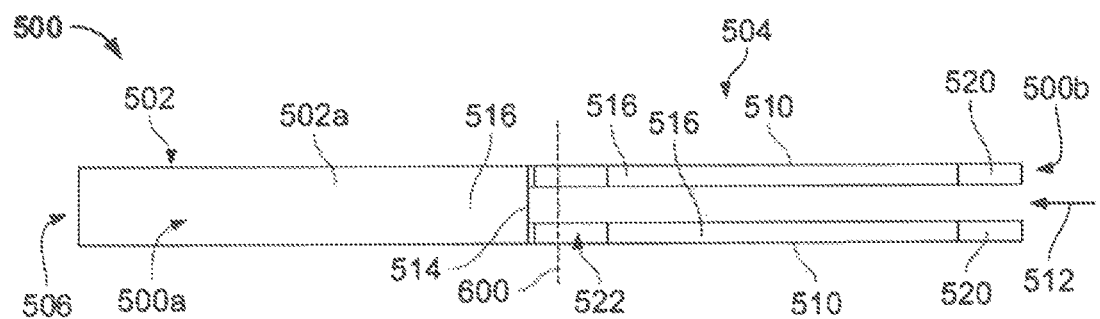
FIG. 6A is a bottom plan view of the cable toggle of FIG. 5A.
Figure 6B:
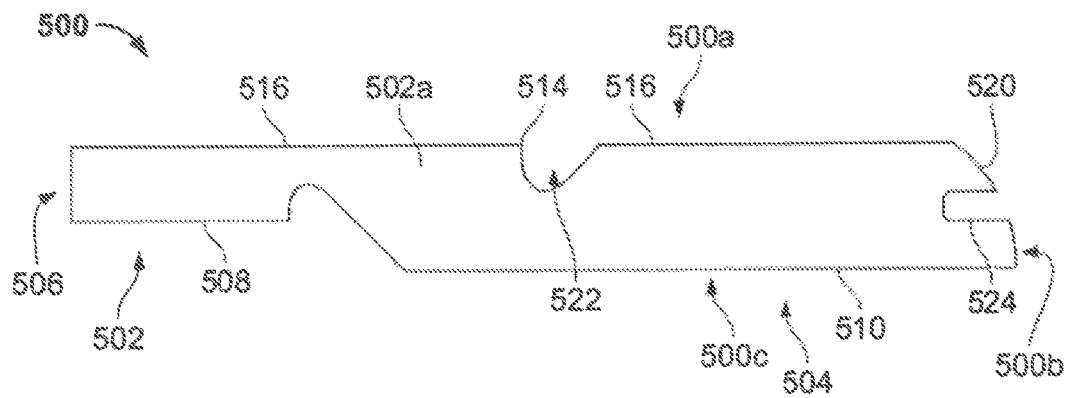
FIG. 6B is a front elevation view of the cable toggle of FIG. 5A.
Figure 6C:
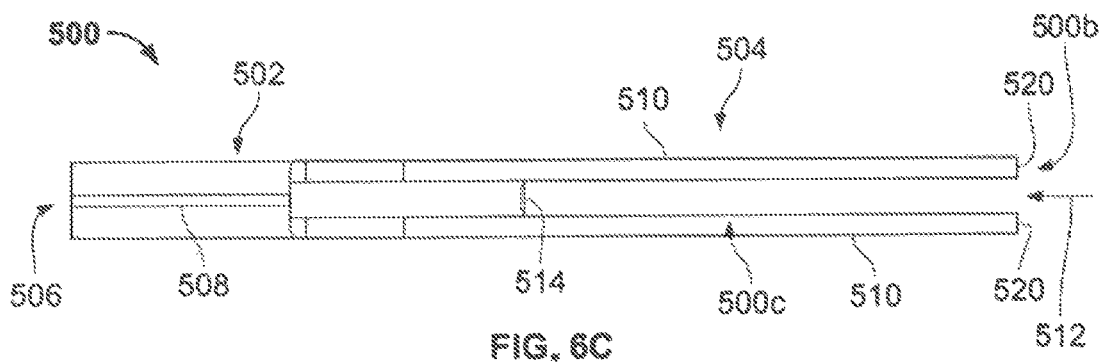
FIG. 6C is a top plan view of the cable toggle of FIG. 5A.

As illustrated in FIG. 6C in particular, the cable channel 512 is configured to be substantially open along the plates 510. In particular, in the embodiment illustrated, the cable channel 512 is fully open along a loading side 500a of the toggle 500 and at an end 500b of the toggle 500, and is partly open along a non-loading side 500c of the toggle 500. In some embodiments, the illustrated configuration can facilitate formation of the toggle 500 through stamping or other techniques, as well as providing relatively substantial overall strength and enabling uses as described below. In some embodiments, it may be beneficial to configure the cable channel 512 to be open in other ways.

In the embodiment illustrated, the crimp section 502 includes a continuous folded edge 502a along the loading side 500a of the toggle 500 (i.e., at top left in FIG. 5A). This configuration can result, for example, from stamping operations on a single-piece blank to form a trough (not shown) for the crimp section 502, which can later be crimped into the illustrated generally circular profile to secure a cable. At approximately the center of the toggle 500 (relative to the elongate direction), the continuous folded edge 502a of the crimp section 502 terminates, thereby providing for an open side along the cable channel 512. In the embodiment illustrated, the termination of the folded edge 502a also defines a cable relief feature 514 at which the cable can bend relative to the crimp section 502 (e.g., at approximately 90°) to extend away from the toggle 500. In some embodiments, the cable relief feature 514 and the open side of the cable channel 512 at the loading side 500a of the toggle can result from removal of material along a centerline of the relevant blank for stamping operations.

In some embodiments, channel walls and a cable portion of a toggle can define substantially parallel, co-planar loading surfaces along a loading side of a toggle. For example, as noted above, the toggle 500 includes a loading side 500a. As illustrated in FIG. 5A, for example, loading surfaces 516 are defined by load-bearing side of the crimp section 502, including the folded edge 502a, and by the side-wall plates 510 of the cable channel 512. Further, in the embodiment illustrated, the loading surfaces 516 extend along the same contact plane, to be substantially parallel and co-planar with each other. In some embodiments, formation of channel walls and a cable portion to exhibit parallel loading surfaces can be achieved via removal of an appropriate amount of material along a centerline of a blank along the portion that will be formed into the channel walls (e.g., as also discussed above).

In some configurations, the use of parallel, co-planar loading surfaces along substantially all of the length of the toggle 500 (e.g., as described above) can provide for a relatively stable and high-strength engagement of the toggle 500 with a structure. Further, as also noted above, because the side-wall plates 510 of the cable channel 512 are oriented generally perpendicularly to the loading surfaces 516 (and the load bearing side 500a, generally), the toggle 500 can generally be loaded along the cable channel 512 as an edge-toggle (e.g., in contrast to a plate-toggle, as illustrated in FIGS. 1-4). In this regard, for example, the depth of the plates 510 in a direction extending away from the loading surfaces 516 can be selected in order to provide appropriate strength (e.g., resistance to buckling) for the toggle 500, so the toggle 500 can appropriately support expected loads via engagement between the load surfaces 516 and a supporting structure.

In some embodiments, a transition region can be defined between a fully open portion of a cable channel and a cable-engagement feature of a cable portion of a toggle. For example, as illustrated in particular in FIGS. 6D and 6E, portions of the plates 510 and the cable channel 512 extend along the cable guide section 504 between the fully open portion of the channel 512 (at right in FIG. 6B) and the crimp section 502. Accordingly, along part of the toggle 500, the folded edge 502a (see, e.g., FIGS. 6A and 6B) closes one side of the channel 512. In some embodiments, this may facilitate appropriate stamping (or other formation) of the toggle 500, as well as improve overall performance of the toggle 500.

In some embodiments, the side walls of a cable channel can terminate with curved or otherwise contoured edges. This may be useful, for example, to allow relatively easy installation of the toggle 500. For example, as also discussed below, contoured ends of a toggle can be configured to engage a support surface during installation in order to automatically rotate the toggle into an installed orientation.

In the embodiment illustrated, the side-wall plates 510 of the cable channel 512 terminate at curved guide edges 520 at the end 500b of the toggle 500, opposite the crimp section 502. As also discussed below, during installation of the toggle 500, contact between the guide edges 520 and a support structure can cause the toggle 500 to automatically rotate between an installation configuration and an installed configuration, so that the toggle can automatically seat against a back surface of a structure at a relevant fixing aperture.

In the embodiment illustrated, the guide edges 520 exhibit a non-constant radius of curvature, with a more pronounced curvature near the non-loading side of the toggle 500 and a less pronounced curvature near the loading side of the toggle 500. This may be useful, for example, in order to achieve appropriate rotation of the toggle 500 to the installed configuration upon an initial loading of the cable. However, in other embodiments, other geometries are possible. For example, any degree of curvature (or combination of curvatures) can be included along the guide edges 520, as appropriate. In some embodiments, a guide edge (or other similar feature) may be partly or wholly non-curved (e.g., partly formed as a set of angled surfaces).

In some embodiments, as also noted above, a cable relief section, such as provided by the cable relief feature 514, can be included in the toggle 500. The cable relief feature 514 can generally allow for a cable to transition out of the crimp section 502 (or other cable portion of a toggle) and bend away from the toggle 500 to support a load, without imposing undue stress or wear on the cable.

In certain configurations, it can be beneficial for the cable relief feature 514 to be disposed between the crimp section 502 and the cable channel 512. In some embodiments, the cable relief feature 514 can be directly adjacent to the cable guide section 504.

In some embodiments, one or more edges of the cable relief feature 514 can be coined or otherwise formed or processed in order to reduce any stress or wear on the cable as the cable transitions out of the toggle 500. In some embodiments, for similar (or other) reasons, a cable relief section can include other features, such as widened or otherwise contoured spaces within the cable channel 512.

Generally, a cable relief section of a toggle can include an opening for the cable to pass through, to exit the relevant toggle and pass through a relevant fixing hole. In the embodiment illustrated, for example, a notch 522 is provided in the toggle 500 adjacent to the cable relief feature 514, extending inwardly relative to a plane defined by the loading surfaces 516. Generally, inclusion of the notch 522 can allow the toggle 500 to be formed to support a bend in a cable with relatively low tension or strain on the cable (other than that inherent to any tensile loading of the cable itself).

In some embodiments, as also discussed below, a toggle can rotate during installation. In some embodiments, a rotational axis for installation can be generally coincident with a cable relief section of the toggle. For example, FIG. 6A illustrates an approximate location of a rotational axis 600 for the toggle 500. In the embodiment illustrated, the rotational axis 600 is generally aligned with (e.g., extends generally through or near) the notch 522 adjacent to the cable relief feature 514. In other embodiments, other configurations are possible.

As also discussed below, as the toggle 500 rotates about the rotational axis 600 during installation, free portions of a cable that is engaged in the crimp section 502 can move relatively freely through the cable channel 512, including to extend generally in parallel with the elongate direction of the toggle 500. Similarly, the toggle 500 can also rotate about the rotational axis 600 to exit the cable channel 512 and bend away from the toggle 500, as may be useful to support a load relative to a structure.

In some embodiments, one or more engagement features can be included on a toggle, as may be useful to assist during installation or removal of the toggle relative to a particular structure. In the embodiment illustrated, for example, engagement features are formed as slots 524 extending into the guide edges 520 at the end 500b of the toggle 500. As also discussed below, the slots 524 can be configured to be engaged by a hand tool to assist in passing the toggle 500 through a fixing aperture.

As also noted above, in some embodiments, the toggle 500 can be formed (e.g., stamped) with a single-piece construction. In some embodiments, the toggle 500 can be formed from one continuous piece of sheet metal. In some cases, configuring the toggle 500 to be formed from a single piece of material can reduce manufacturing time or cost as compared to traditional two-piece toggle configurations. Further, installation of a single-piece toggle can be somewhat easier that installation of multiple-piece toggles, including due to avoiding the need to manage loose pieces such as the loose toggle plate 100 (see, e.g., FIG. 1A).

FIG. 7 shows an example installed configuration of the toggle 500. In the arrangement illustrated, the toggle 500 is arranged to secure a cable 700 to a support structure 710 that includes a fixing aperture 706. In particular, the cable is secured within the through-hole 506 at the crimp section 502 of the toggle 500. From the crimp section 502, the cable 700 then transitions into the cable guide section 504, before angling at approximately 900 away from the toggle 500 at the cable relief feature 514 to extend through the fixing aperture 706. Once the toggle 500 is properly installed, a load (not shown) can then be applied to the cable 700, with the length and orientation of the toggle 500 preventing the toggle 500 from passing back through the fixing aperture 712.

Generally, to support the load on the cable 700 relative to the structure 710, the loading surfaces 516 of the toggle 500 can directly bear on the structure 710, on an opposite side of the structure 710 from a load. Further, as also noted above, the toggle 500 is configured to be installed as an edge-toggle in the installation configuration illustrated in FIG. 7. Accordingly, when a load is applied to the cable 700, the toggle 500 can distribute relatively substantial force from the cable 700 to the structure 710.

In the arrangement illustrated in FIG. 7, the toggle 500 supports an upward load on the cable 700 (relative to the illustrated orientation). In other embodiments, other arrangements are possible. For example, the toggle 500 can be similarly installed on an opposite side of the structure 710 to hang a load from the cable 700 below the structure 710 (relative to the illustrated orientation)

FIGS. 8A and 8B illustrate example operations for installation of the toggle 500 on the structure 710. As illustrated in FIG. 8A, the cable 700 and the toggle 500 can first be oriented to be passed through the fixing aperture 712 in the structure 710. For example, the toggle 500 can be rotated to extend substantially along the elongate direction of the cable 700 (as shown in FIG. 8A), with the cable 700 extending within the channel 512 past the cable relief feature 514 and the notch 522. This can, for example, generally reduce the combined width of the cable 700 and the toggle 500 so that the toggle 500 and the cable 700 can simultaneously pass through the fixing aperture 712.

As illustrated in FIG. 8B, once inserted through the fixing aperture 712, the toggle 500 can be rotated into an installed configuration in which the elongate direction of the toggle 500 is generally perpendicular to the extended length of the cable 700, as measured at approximately the cable relief feature 514. Correspondingly, in the installed configuration, the loading surfaces 516 can extend substantially in parallel to an adjacent surface on the structure 710. As also discussed above, the loading surfaces 516 of the toggle 500 can thus engage (e.g., directly contact) the structure 710, to secure the cable 700 to the structure 710 and generally distribute onto the structure 710 forces from tensile loading of the cable 700.

As also noted above, guide edges of a toggle can assist in installation of a toggle relative to a structure. In this regard, for example, lightly loading the cable 700 after the toggle 500 has passed through the fixing aperture 712, but before the toggle 500 has fully rotated to the installed orientation illustrated in FIG. 8B, can cause the guide edges 520 of the toggle 500 to engage the structure 710. As drive by the tensile cable forces, the geometry of the guide edges 520 (e.g., as discussed above) can thereby automatically rotate the toggle 500 into the installed configuration, so that the toggle 500 cannot readily pass back through the fixing aperture 712. Accordingly, for example, users can sometimes install the toggle 500 for support of loads by merely inserting the toggle 500 into the fixing aperture 712 with the toggle 500 in the installation configuration, then pulling on the cable 700 from an opposite side of the support structure 710 to rotate the toggle 500 to the installed configuration.

FIGS. 9A and 9B illustrate the toggle 500 in cross-section, during an example installation relative to the structure 710 that is similar to the installation illustrated in FIGS. 8A and 8B. As similarly discussed above, during installation, the toggle 500 can be rotated so that the cable 700 generally extends along the elongate direction of the toggle 500, with the guide edges 520 pointed generally away from the structure 710. As illustrated in FIG. 9A, the cable 700 and the toggle 500 can then be fed through the fixing aperture 706, so that the guide edges 520 point generally towards the structure 710, but on an opposite side of the structure 710 from a load-supporting portion of the cable 700. Finally, the toggle 500 can be rotated to the installed orientation, as illustrated in FIG. 9B, to support a load relative to the structure 710.

In some embodiments, with a toggle in the installation configuration, an attached cable may extend along the elongate direction of the toggle, at a somewhat oblique angle relative to a loading surface. For example, as illustrated in FIG. 9A in particular, when the toggle 500 is in the installation configuration, the cable 700 can extend through the channel 512, substantially past the cable relief feature 714 and the notch 722, at a slight angle relative to the loading surfaces 516. This may be useful, for example, in order to dispose the toggle 500 generally for insertion through the fixing aperture 712, while also orienting the guide edges 520 to readily engage the support structure 710 when the cable 700 is initially loaded, in order to automatically rotate the toggle 500 into the installed configuration of FIG. 9B (e.g., as also described above). In other embodiments, other configurations are possible.

As also discussed above, in some embodiments, a crimp seam or other similar structure can be generally disposed away from the loading side of a toggle. For example, as illustrated in FIG. 9B, the crimp seam 508 is disposed generally opposite the loading surfaces 516 of the toggle 500. Accordingly, for example, loading of the cable 700 may urge the cable 700 into a solid portion of the crimp section 502 (e.g., along the folded edge 502a) rather than into the crimp seam 508, which may thereby avoid the loading of the cable 700 pulling the crimp seam 508 apart or otherwise urging the cable 700 to pass through the crimp seam 508. This may be particularly useful, for example, with elastic (or other) cables that can tend to deform to pass through crimp seams when sufficiently loaded.

In some embodiments, a toggle according to the invention can be sized to fit within a ¼" fixing aperture. In some embodiments, a toggle according to the invention can be used with a range of cable sizes (e.g., a 1.5 mm cable or a 2 mm cable), such as by adjusting the size of a crimp section during stamping or during attachment of the cable. In different embodiments, any number of sizes of a toggle and/or a crimp section (or other relevant structure) can be provided, based upon the particular application, fixing-hole dimension, and so on.

Figure 10:
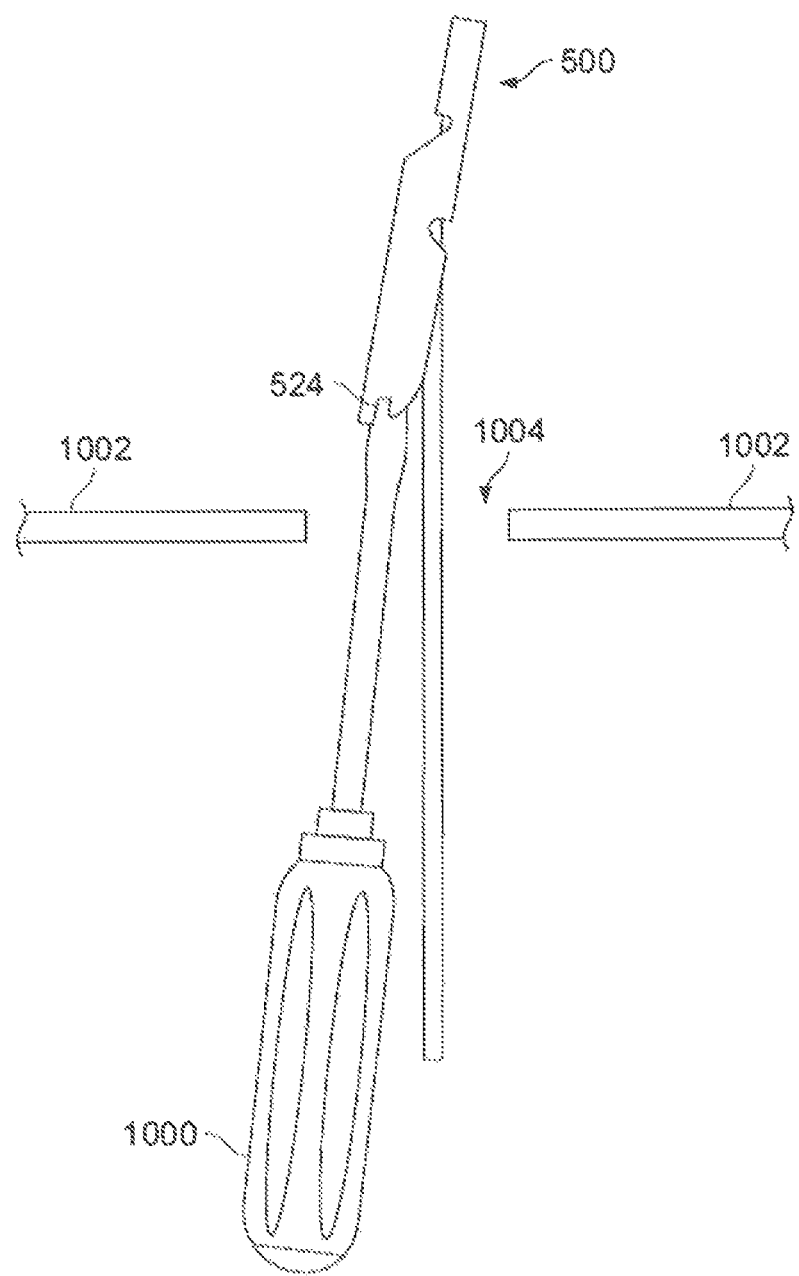
FIG. 10 is an isometric view of the cable toggle of FIG. 5A, with a tool engaged to remove the cable toggle from a structure.

As also noted above, in some embodiments, a toggle can include one or more features to assist in removing a toggle from a relevant structure (e.g., after the toggle has been incorrectly installed). For example, as illustrated in FIG. 10, a hand tool such as a screwdriver 1000 can be used to engage the slots 524 in order to manipulate and maintain the orientation of the toggle 500. This can be useful, for example, in order to assist in removing the toggle 500 from a structure 1002 after the toggle 500 has been installed (e.g., installed incorrectly). For example, after installation of the toggle 500 (e.g., as discussed above), the screwdriver 1000 (or other tool) can be extended through a fixing aperture 1004 of the structure 1002 in order to engage the slots 524. The screwdriver 1000 can then be used to dispose, and maintain, the toggle 500 in the installation configuration (e.g., as illustrated in FIG. 10) so that the toggle 500 can be guided through a fixing aperture 1004, and thereby separated from the structure 1002. In contrast, conventional toggles may not be similarly equipped and are often simply cut free of the relevant cable and discarded when improperly installed or otherwise in need of removal from a structure.

Thus, embodiments of the invention provide improved toggles for attaching cables to structures. In some embodiments, a toggle according to the invention can be configured to have additional load capacity when compared to conventional two-piece toggle systems. For example, in keeping with the discussion above, embodiments of the invention can have a greater moment of inertia, in the relevant (e.g., load-bearing) cross-section, as compared to traditional two-piece toggle systems. Accordingly, for example, lower strength materials (e.g., quarter hard, pre-galvanized, low carbon steel) can be used without significant (or even any) loss in load capacity relative to comparative conventional designs. Further, in some embodiments, toggles according to the invention can exhibit a single-piece construction, which can improve the ease of manufacturing and installation. Additionally, in some embodiments, toggles according to the invention can be configured to automatically move (e.g., rotate) into appropriate load-bearing orientations during installation, thereby significantly improving ease and reliability of installation for users.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto.

Various features of the invention are set forth in the following claims.

The invention claimed is:

1. A toggle to secure a cable relative to a structure with a fixing aperture, the toggle comprising:
   a single-piece body that includes:
      a cable portion that defines a loading side and is configured to receive and secure the cable; and
      side walls that extend from the cable portion to define a channel;
   the channel extending between a loading side of the side walls and a non-loading side of the side walls, and the channel being at least partly open along the loading side of the side walls and at least partly open along the non-loading side of the side walls;
   the loading side of the side walls extending substantially in parallel with the loading side of the cable portion to define substantially parallel loading surfaces along the side walls and the cable portion;
   the single-piece body being configured to engage the structure along the substantially parallel loading surfaces to secure the cable relative to the structure;
   the substantially parallel loading surfaces extending along a common plane; and
   the single-piece body including a notch disposed along the channel on the loading side of the side walls, the notch defining a deviation from the common plane.

2. The toggle of claim 1, wherein the single-piece body has an elongate direction; and
   wherein, when the cable is secured in the cable portion, the toggle is configured to move between:
      an installation configuration in which the cable extends from the cable portion and along the channel, substantially along the elongate direction; and
      an installed configuration in which, with the side walls bearing on the structure along the substantially parallel loading surfaces, the cable extends from the cable portion and out of the loading side of the channel to be disposed substantially perpendicularly to the elongate direction and to the substantially parallel loading surfaces.

3. The toggle of claim 2, wherein each of the side walls includes a respective curved edge opposite the cable portion; and
   wherein, with the cable extending through the fixing aperture and subjected to a tensile load, the curved edges are configured to engage the structure to move the toggle from the installation configuration to the installed configuration.

4. The toggle of claim 1, wherein the notch defines a rotational axis; and wherein body is configured to rotate about the rotational axis to move between an installation configuration and an installed configuration.

5. The toggle of claim 4, wherein with the toggle in the installed configuration, the cable bends at approximately 90 degrees at the notch to extend out of the channel and through the fixing aperture.

6. The toggle of claim 1, wherein the channel is closed along the loading side of the side walls between the notch and the cable portion and open along the remainder of the loading side of the side walls and along the non-loading side of the side walls.

7. The toggle of claim 1, wherein at least part of the single-piece body is configured to be crimped around the cable to define a crimp seam; and
wherein the crimp seam extends along the cable portion opposite the loading side of the cable portion.

8. The toggle of claim 1, for use with a tool, wherein the single-piece body has an installation configuration in which the cable extends from the cable portion along the channel, past a cable relief feature;
wherein the single-piece body has an installed configuration in which the cable extends substantially perpendicularly out of the channel at the cable relief feature; and
wherein the toggle further includes at least one engagement feature that is configured to receive the tool, in order to maintain the single-piece body in the installation configuration during insertion of the toggle through the fixing aperture and withdrawal of the toggle from the fixing aperture.

9. The toggle of claim 8, wherein the at least one engagement feature includes a respective slot extending into each of the side walls, substantially opposite the cable portion of the single-piece body.

10. The toggle of claim 9, wherein each of the slots extends into a curved edge of a respective one of the side walls, opposite the cable portion; and
wherein, with the cable extending through the fixing aperture and subjected to a tensile load, the curved edges are configured to engage the structure to move the toggle from the installation configuration to the installed configuration.

11. A toggle to secure a cable relative to a structure with a fixing aperture, for use with a tool, the toggle comprising:
an integrally-formed body with a loading side that is configured to engage the structure to secure the cable to the structure, and a non-loading side that is substantially opposite the loading side;
the integrally-formed body defining an elongate direction and including:
a cable portion that is configured to receive and secure the cable; and
side walls that extend substantially in parallel away from the cable portion to define a channel;
the toggle being configured to move between:
an installation configuration in which the cable extends from the cable portion along the channel, to configure the cable and the toggle to pass together through the fixing aperture; and
an installed configuration in which the side walls and the cable portion engage the structure along the loading side of the channel to prevent the toggle from passing through the fixing aperture, and in which the cable extends out of the loading side of the channel to be disposed substantially perpendicularly to the elongate direction and pass through the fixing aperture;
at least one of the side walls including at least one engagement feature that is configured to receive the tool, in order to maintain the toggle in the installation configuration for passage of the toggle and the cable through the fixing aperture;
the at least one engagement feature including a respective slot extending into a respective curved edge of each of the side walls, substantially opposite the cable portion of the integrally formed body; and
with the cable extending through the fixing aperture and subjected to a tensile load, the curved edges being configured to engage the structure to move the toggle from the installation configuration to the installed configuration.

12. The toggle of claim 11, wherein the cable portion and the side walls collectively define a plurality of substantially parallel loading surfaces along the loading side of the integrally-formed body, the substantially parallel loading surfaces being configured to simultaneously engage the structure when the toggle is in the installed configuration.

13. The toggle of claim 11, wherein each of the side walls includes a respective curved edge opposite the cable portion; and
wherein, with the cable extending through the fixing aperture and subjected to a tensile load, the curved edges are configured to engage the structure to automatically move the toggle from the installation configuration to the installed configuration.

14. The toggle of claim 11, wherein the channel is fully open along the non-loading side of the integrally-formed body and at an end of the integrally-formed body that is opposite the cable portion; and
wherein the channel is partly open along the loading side of the integrally-formed body.

15. A toggle to secure a cable relative to a structure with a fixing aperture, the toggle comprising:
a single-piece body with a loading side configured to engage the structure to secure the cable to the structure, and a non-loading side that is substantially opposite the loading side;
the single-piece body including:
a cable portion that is configured to be crimped around the cable with a crimp seam extending along the non-loading side of the single-piece body; and
a guide portion that extends away from the cable portion to define a channel;
along the loading side of the single-piece body, a loading side of the guide portion extending substantially in parallel with a loading side of the cable portion to define substantially parallel loading surfaces along the guide portion and the cable portion;
the single-piece body being configured to engage the structure along the substantially parallel loading surfaces, to secure the cable relative to the structure, with the cable extending substantially perpendicularly out of the channel to extend through the fixing aperture;
the guide portion includes side walls that extend substantially in parallel to define the channel, the channel being open along the non-loading side of the single-piece body and at an end of the single piece body that is opposite the cable portion, and the channel being partly open along the loading side of the single-piece body;
the substantially parallel loading surfaces extending along a common plane; and the single-piece body including a notch disposed along the channel on the loading side of the side walls, the notch defining a deviation from the common plane and corresponding to a location at which the cable extends out of the channel to extend through the fixing aperture when the single-piece body secures the cable relative to the structure.

16. The toggle of claim 15, wherein each of the side walls includes a respective contoured end opposite the cable portion; and wherein, with the cable extending through the fixing aperture and subjected to a tensile load, the contoured ends are configured to engage the structure to automatically move the toggle from an installation configuration to an installed configuration.

17. The toggle of claim 16, for use with a tool, wherein the toggle has an installation configuration in which the cable extends from the cable portion and along the channel, substantially along an elongate direction of the channel; and wherein at least one of the contoured ends includes a slot extending into the respective side wall, the slot being configured to receive the tool in order to maintain the toggle in the installation configuration during insertion of the toggle through the fixing aperture and during withdrawal of the toggle out of the fixing aperture.

18. The toggle of claim 7, wherein the crimp seam is substantially parallel to the non-loading side of the side walls, wherein the crimp seam extends along a crimp seam plane and the non-loading side of the side walls extend along a side wall plane, and wherein the crimp seam plane is different than the side wall plane.

19. The toggle of claim 11, wherein the cable portion is configured to be crimped around the cable with a crimp seam extending along the non-loading side of the integrally-formed body, wherein the crimp seam extends along a crimp seam plane and the non-loading side of the side walls extend along a side wall plane, and wherein the crimp seam plane is different than the side wall plane.

20. The toggle of claim 15, wherein the crimp seam extends along a crimp seam plane and the non-loading side of the side walls extend along a side wall plane, and wherein the crimp seam plane is different than the side wall plane.

* * * * *